(12) United States Patent
Si et al.

(10) Patent No.: US 10,348,438 B2
(45) Date of Patent: Jul. 9, 2019

(54) SPUR REMOVAL IN PILOT-TONE OPM (71) Applicant: HUAWEI TECHNOLOGIES CO., LTD., Shenzhen (CN)

(72) Inventors: Minggang Si, Shenzhen (CN); Zhiping Jiang, Shenzhen (CN); Jianhong Ke, Shenzhen (CN); Dajiang Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 15/694,983

(22) Filed: Sep. 4, 2017

(65) Prior Publication Data
US 2019/0074923 A1 Mar. 7, 2019

(51) Int. Cl.
H04B 10/00 (2013.01)
H04J 14/02 (2006.01)
H04B 10/69 (2013.01)

(52) U.S. Cl.
CPC ............ H04J 14/021 (2013.01); H04B 10/69 (2013.01); H04J 14/0276 (2013.01)

(58) Field of Classification Search
USPC .......................................... 398/32, 202–214
See application file for complete search history.

(56) References Cited

U.S. PATENT DOCUMENTS

| | | | | | |
|---|---|---|---|---|---|
| 3,988,532 | A | * | 10/1976 | Korpel | G11B 23/0007 386/269 |
| 5,161,044 | A | * | 11/1992 | Nazarathy | H04B 1/62 398/194 |
| 5,436,751 | A | * | 7/1995 | Ohya | H04B 10/504 398/184 |
| 5,812,297 | A | * | 9/1998 | Mussino | G02F 1/0123 398/195 |
| 5,991,330 | A | * | 11/1999 | Dahlman | H04B 1/70735 370/509 |
| 6,172,560 | B1 | * | 1/2001 | Yamashita | H03F 1/3235 330/151 |
| 7,747,166 | B2 | * | 6/2010 | Piotte | H04B 10/00 398/30 |
| 10,148,351 | B2 | * | 12/2018 | Jiang | H04B 10/077 |
| 2004/0109685 | A1 | | 6/2004 | Wan et al. | |

(Continued)

FOREIGN PATENT DOCUMENTS

CN 102439878 A 5/2012
CN 102771067 A 11/2012
(Continued)

*Primary Examiner* — Agustin Bello
(74) *Attorney, Agent, or Firm* — BCF LLP (57) ABSTRACT Embodiments can provide spurs removal in a pilot-tone spread signal. For achieving this, at least one peak in the pilot-tone spread signal may be found. A predetermined small range of the spectra power around the at least one peak may be removed. In some situations, the removal of the spurs in the pilot-tone spread signal may result in inadvertent removal of a normal part of the pilot-tone spread signal. For addressing this, a power ratio between the spectrum of the pilot-tone spread signal before the removal and after the removal can be calculated. For accounting for the power loss due to the spurs removal, this power ratio can be applied to the pilot-tone spread signal after the removal to obtain a corrected pilot-tone spread signal.

18 Claims, 9 Drawing Sheets (56) References Cited

U.S. PATENT DOCUMENTS

| | | | |
|---|---|---|---|
| 2005/0031342 A1* | 2/2005 | Wu | H04B 10/505 |
| | | | 398/32 |
| 2009/0232518 A1* | 9/2009 | Caton | H04B 10/5051 |
| | | | 398/193 |
| 2011/0206385 A1 | 8/2011 | Chen et al. | |
| 2012/0275782 A1 | 11/2012 | Rapp et al. | |
| 2013/0121381 A1* | 5/2013 | Smiley | H04B 1/7097 |
| | | | 375/146 |
| 2014/0178065 A1 | 6/2014 | Mertz et al. | |
| 2014/0369686 A1* | 12/2014 | Pelekhaty | H04B 10/6162 |
| | | | 398/65 |
| 2015/0078764 A1* | 3/2015 | Karaki | H04B 10/614 |
| | | | 398/208 |
| 2016/0197804 A1* | 7/2016 | Zinevich | H04L 43/08 |
| | | | 370/252 |
| 2017/0082756 A1* | 3/2017 | Parikh | G01S 19/37 |
| 2017/0244479 A1* | 8/2017 | Jiang | H04B 10/077 |
| 2017/0245223 A1 | 8/2017 | Nan et al. | |

FOREIGN PATENT DOCUMENTS

| | | |
|---|---|---|
| CN | 105265000 A | 1/2016 |
| JP | 2008042558 A | 2/2008 |

\* cited by examiner

Before Decoding

FIG. 5A

After Decoding

SPUR REMOVAL IN PILOT-TONE OPM

TECHNICAL FIELD

The present disclosure relates generally to optical telecommunications and, more particularly, to optical performance monitoring using a pilot tone.

BACKGROUND

In dense wavelength division multiplexed (DWDM) systems, a pilot tone (PT) is used to conduct optical performance monitoring. The pilot tone is a small and low-frequency modulation (e.g. kHz to MHz) applied to a high-speed optical channel, thus providing an in-band ancillary channel for performance monitoring. The pilot tone may be used to carry wavelength and other link-characterizing information for a fiber link in the DWDM systems.

BRIEF SUMMARY

In various embodiments, an optical receiver configured to remove spectral spurs in a pilot-tone spread signal is provided. As used herein, a pilot-tone spread signal may be referred to as an expanded-spectrum pilot tone that is modulated onto a data-carrying signal when transmitted. Such a signal can contain spectral spurs that may interfere with the pilot tone. In those embodiments, the optical receiver may comprise a spurs removal component configured to remove the spectral spurs in the pilot-tone spread signal in a frequency domain before the pilot-tone is decoded. The removal of the spectral spurs in the pilot-tone spread signal may result in higher accuracy and/or efficiency in decoding the pilot tone.

In some situations, the removal of the spectral spurs in the pilot-tone spread signal may result in inadvertent removal of a normal part of the signal. To compensate for such a power loss due to the spurs removal, the optical receiver, in some embodiments, may be configured with a power compensation ratio factor calculation component. This component can be configured to calculate a power ratio between the ideal signal without spurs and the signal spectrum after the removal. In those embodiments, the optical receiver can be configured with power correction component configured to apply the power compensation ratio to the pilot-tone spread signal after the spurs removal to obtain a corrected pilot-tone spread signal.

In some embodiments, the spurs removal by the spurs removal component may comprise finding at least one peak in the pilot-tone signal and removing a predetermined range of spectra around the at least one peak. In one embodiment, the at least one peak can be found by determining whether a power of the pilot-tone spread signal is above a predetermined threshold. In that embodiment, in response to the determination that the power of the pilot-tone spread signal is above the threshold, a predetermined small range of spectra around the at least one peak can be removed. In that embodiment, an index of a frequency of pilot-tone spread signal at which the predetermined small range of spectra is removed can be recorded.

Additional features, advantages, and embodiments of the invention may be set forth or apparent from consideration of the following detailed description, drawings, and claims. Moreover, it is to be understood that both the foregoing summary of the invention and the following detailed description are examples and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

DETAILED DESCRIPTION

An optical network connects computers (or any other device which can generate or store data in electronic form) using optical fibers. To facilitate data communication, an optical network can include optical devices to generate optical (electrical) signals from electrical (respectively optical) data, to restore optical signals after they propagate through fibers, and to route optical signals through the network. Dense Wavelength Division Multiplexing (DWDM) is a fiber-optic transmission technique. It typically involves a process of multiplexing many different wavelength signals onto a single fiber link. An individual fiber link in a DWDM system can have a set of parallel optical channels. These channels may be the same or different from channels in other fiber links.

Figure 1:
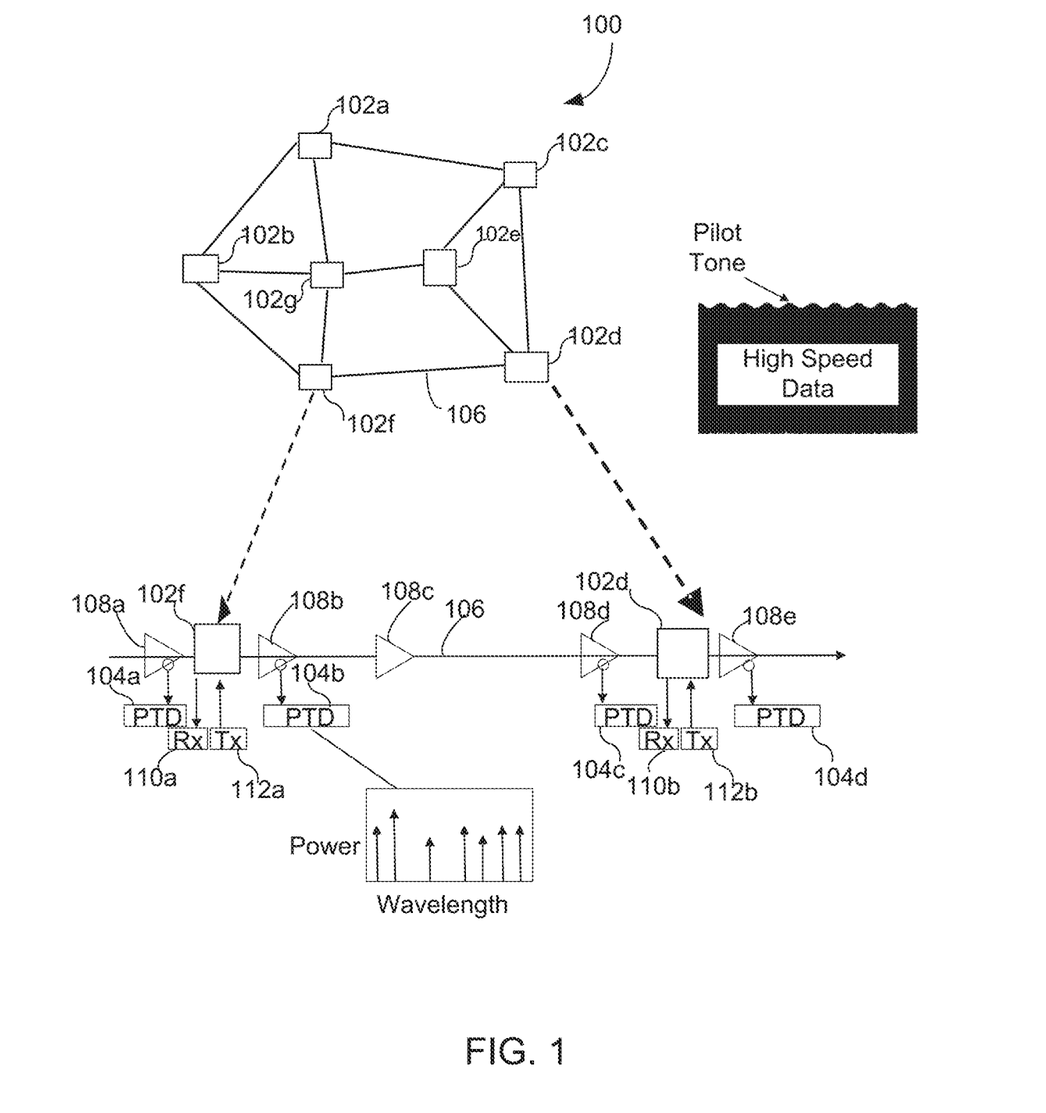
FIG. 1 illustrates one example optical network in accordance with the disclosure.

FIG. 1 illustrates one example optical network 100 in accordance with the disclosure. As shown, optical network 100 can have a plurality of nodes 102, such as nodes 102a-g illustrated in FIG. 1. An individual node 102, such as node 102*f* and node 102*d*, can include a reconfigurable optical add-drop multiplexer (ROADM) to multiplex many different wavelength signals onto a fiber link (e.g., link 106) connecting the individual nodes 102. In an optical network, Optical add-drop multiplexers (OADMs) are typically referred to as nodes where channels can be added/dropped. ROADM is a type of OADM that is typically used in a DWDM system. In FIG. 1, details of the fiber link 106 between nodes 102*f* and 102*d* are illustrated. As shown, the fiber link 106 can include optical Erbium-doped fiber Amplifiers (EDFA) 108 such as 108*a-e*, a plurality of pilot-tone detectors (PTDs) 104, such as 104*a-f* shown in this example, and/or any other components.

The PTDs 104 can be placed at various locations on the fiber links in the optical network 100 for monitoring channel information, such as wavelength, power, modulation format, baud rate, and/or other performance characteristics. An individual PTD, such as PTD 104*a*, can include a low-speed photodiode, an electric amplifier, an analog-to-digital converter, and a digital signal processor (DSP). As shown, a transmitter (Tx), such as 112*a*, can communicate with a receiver (Rx), such as 110*b*, through nodes 102*f* and 102*d* in the optical network 100. At an individual node 102, such as node 102*d*, there may be one or more transmitters and/or one or more receivers connecting to the individual node 102. It should be understood the example shown in FIG. 1 only shows one Tx/Rx connecting to an individual node 102 only for the sake of simple illustration. Pilot tones can be applied to every wavelength at a given Tx. In this example, a low-frequency amplitude modulation is added to the high speed data signal. Pilot tones can be applied within the Tx, or applied externally using an intensity modulator, such as a Variable Optical Attenuator (VOA), or a Semiconductor Optical Amplifier (SOA).

In a fiber link, for example fiber link 106 as shown, different pilot tones can be applied to different wavelengths. For example, the pilot tones can be in different frequencies. Information regarding the channel can be carried by the pilot tone, such as channel wavelength, baud rate, modulation format, etc.

Figure 2:
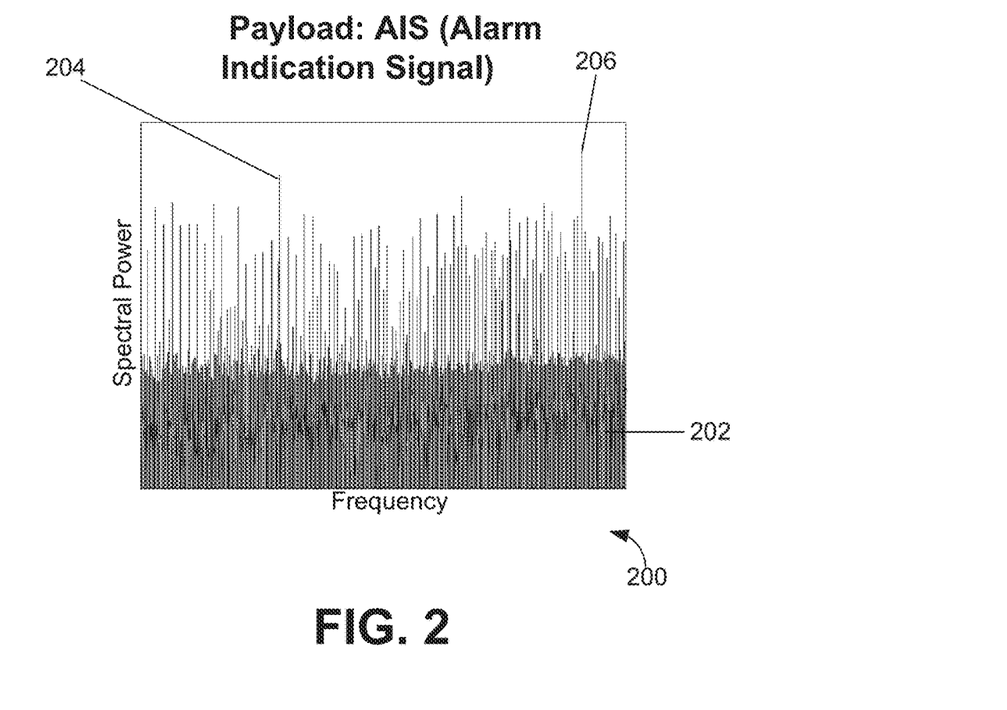
FIG. 2 illustrates one example graph illustrating a spectrum of an AIS payload that can interfere with the pilot tone in a given channel on a link in an optical network.
Figure 3:
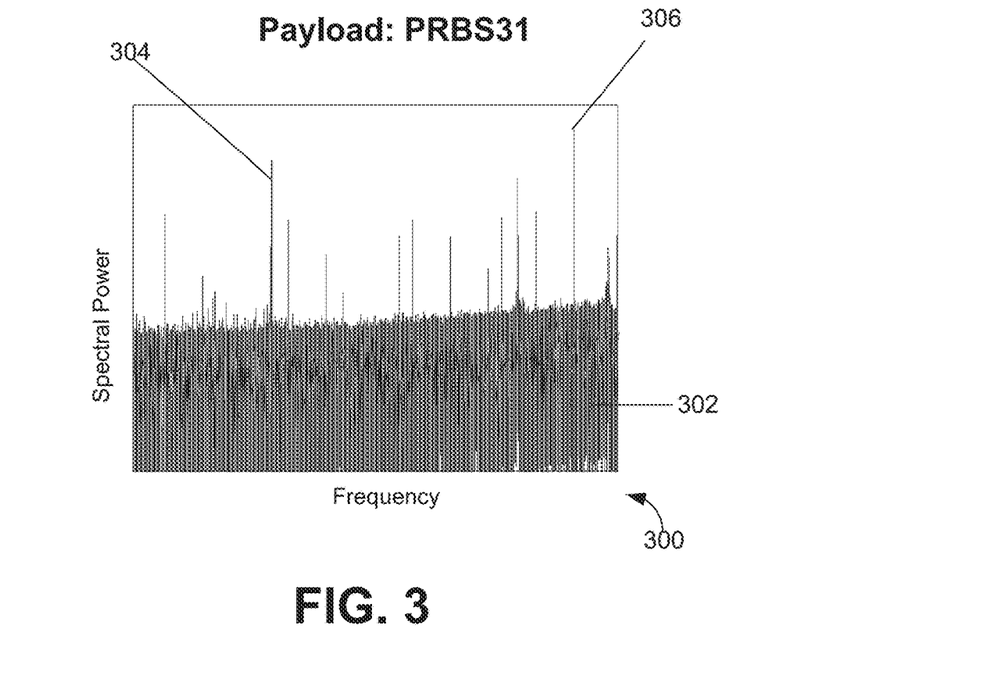
FIG. 3 illustrates an example graph illustrating a pseudo random bit sequence (PRBS) payload that can interfere with the pilot tone in a given channel on a link in an optical network.

In various situations, there could be strong discrete tones ("interference tones") in a high-speed data channel for link 106 due to factors such as forward error correction (FEC) and digital signal processor (DSP) frame structure, especially when the payload contains an Alarm Indication Signal (AIS), an Open Connection Indication (OCI), a locked status (LCK) or the like. These interference tones may coincide with the pilot tone frequency, making pilot tone detection challenging. Such discrete tones depend on the payload, transmitter baud rate, etc. In practice, it may be difficult, particularly for signals carrying the AIS, OCI, LCK payloads, to avoid these tones by selecting non-interfering pilot tone (PT) frequencies because there are so many different baud rates (including clock drift), FEC codes, DSP frame structures, etc. Two examples of the interference tones are illustrated in FIGS. 2-3. FIG. 2 illustrates one example graph 200 illustrating a spectrum of an AIS payload 202 that can interfere with the pilot tone 204 in a given channel on a link in an optical network. FIG. 3 illustrates an example graph 300 illustrating a pseudo random bit sequence (PRBS) payload 302 that can interfere with the pilot tone 304 in a given channel on a link in an optical network.

As can be seen from both FIG. 2 and FIG. 3, it could be difficult to "extract" the pilot tones from the AIS payload, PRBS payload or real traffic payload. Some solutions were proposed to address this challenge. For example, pilot tone spread spectrum techniques were proposed. These techniques are designed to spread the pilot tone into different frequencies and thus make it less susceptible to interference in a single frequency. For instance, U.S. application Ser. No. 15/074,243, entitled "Optical Channel Monitoring Using Expanded-Spectrum Pilot Tone", filed on Mar. 18, 2016 describes optical performance monitoring techniques that use an interference-tolerant expanded-spectrum pilot tone scheme. U.S. application Ser. No. 15/074,243 is incorporated by reference herein.

Figure 4A:
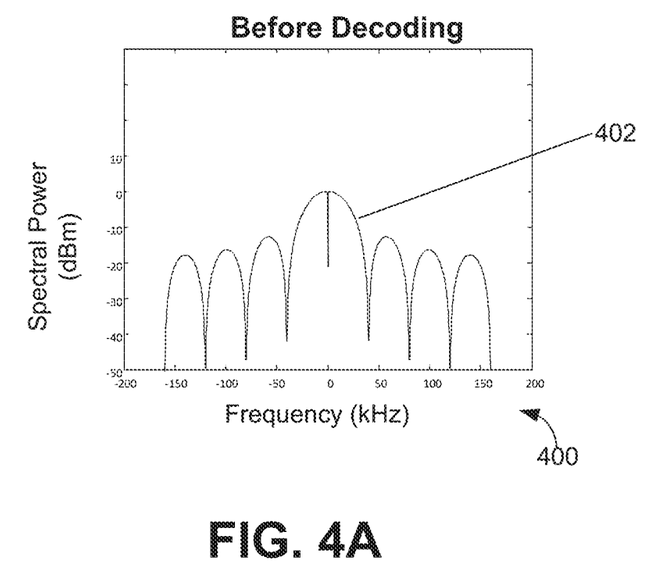
FIG. 4A illustrates a spectrum spread for a pilot tone that is spread into different frequencies without spectral spurs.
Figure 4B:
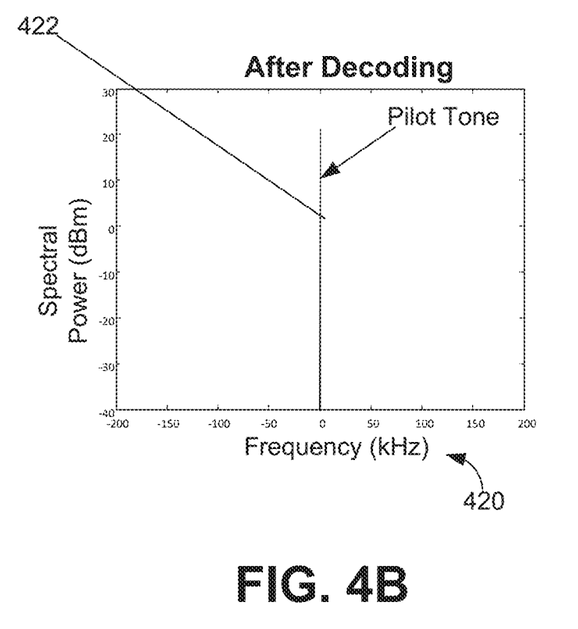
FIG. 4B illustrates a pilot tone that can be decoded from the spectrum spread shown FIG. 4A.
Figure 5A:
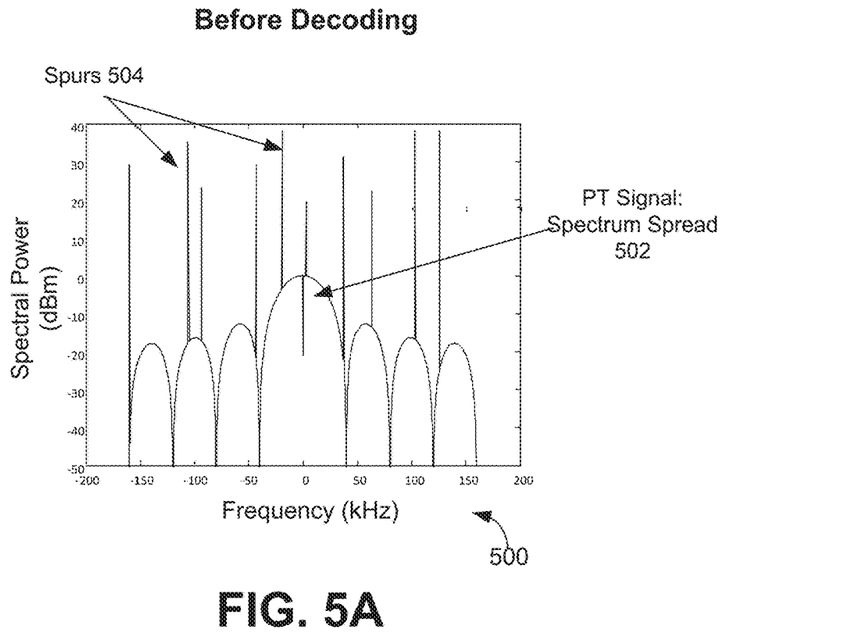
FIG. 5A illustrates a spectrum spread for a pilot tone that is spread into different frequencies may include spectral spurs.
Figure 5B:
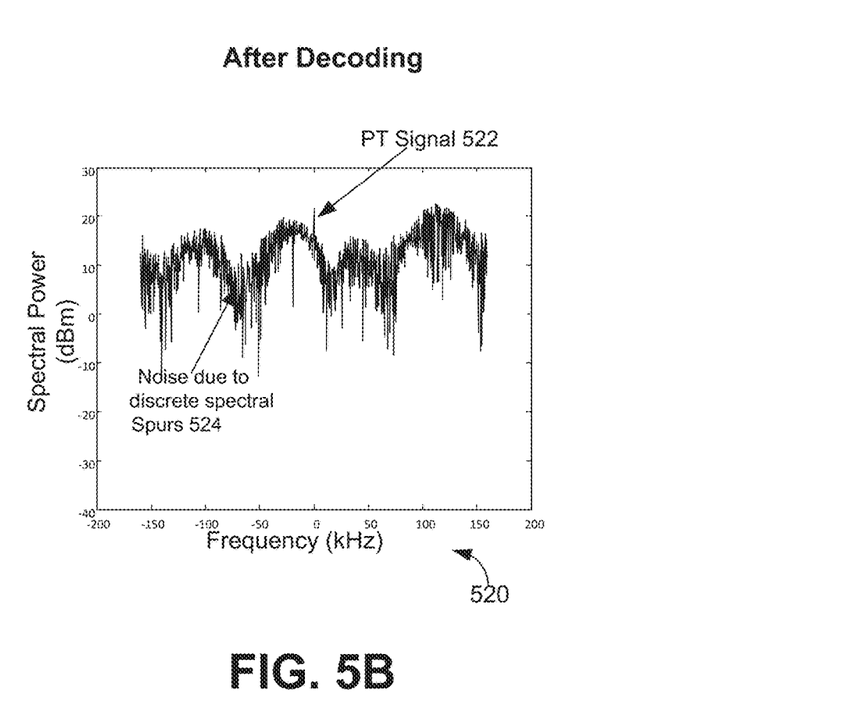
FIG. 5B illustrates a pilot tone that can be decoded from the spectrum spread shown in 5A.

As also can be seen in FIGS. 4-5, there could be sharp noise or spectral spurs 206 or 306 in a frequency domain for the high speed data. As used herein, spectral spurs can be understood as discrete interference peaks in the frequency domain. Some of the proposed spectrum-spreading techniques may not be sufficient to decode the pilot tone when there are strong spectral spurs near the pilot-tone frequency. This is illustrated through FIGS. 4-5. FIG. 4A is an example graph 400 illustrating a spectrum spread 402 for a pilot tone that is spread into different frequencies without spectral spurs. As illustrated in example graph 420 shown in FIG. 4B, some of the proposed spectrum spreading techniques can decode the spread pilot tone 422 as shown in graph 400 in situations where the noise in the spread pilot tone 422 is limited. However, as mentioned above, this may not always be the case. FIG. 5A illustrates one example graph 500 showing a spread spectrum 502 for a pilot tone spread into different frequencies may include spectral spurs 504. FIG. 5B illustrates one example graph 520 showing that the decoding of the spectrum spread 502 may result in noise 524 in addition to the decoded pilot tone 522. Because the location of the spurs in the spectrum spread 502 can be random, the location of the spurs can be very difficult (if not impossible) to predict in advance. Accordingly, a pilot tone encoded and decoded using some of the proposed spectrum-spreading techniques can have a spread spectrum of spurs that can raise the noise level in the pilot tone, and hence leads to a low signal to noise ratio (SNR). After decoding, the pilot-tone becomes a single frequency, and the noise background resulting from the spurs 504 can be very high. That is, when there are spurs 504 in the frequency domain, the decoded pilot tone signal 522 under some of the proposed spectrum-spreading techniques could be obscured in the noise.

Figure 6A:
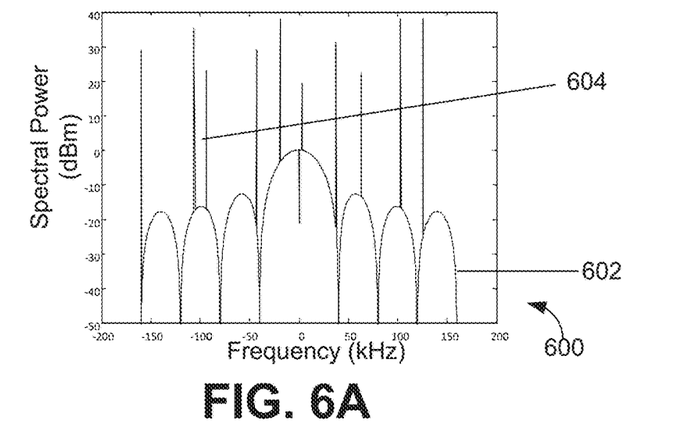
FIG. 6A illustrates a spread spectrum for a pilot tone that includes noise.
Figure 6B:
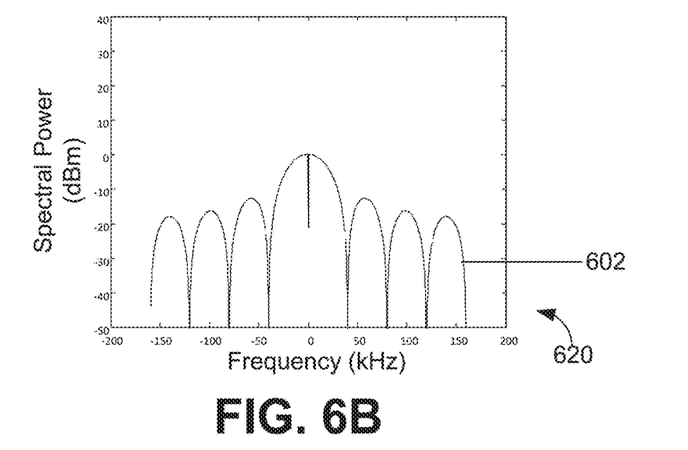
FIG. 6B illustrates the noises or spurs shown in FIG. 6A can be removed from the spread spectrum before decoding the pilot tone.
Figure 6C:
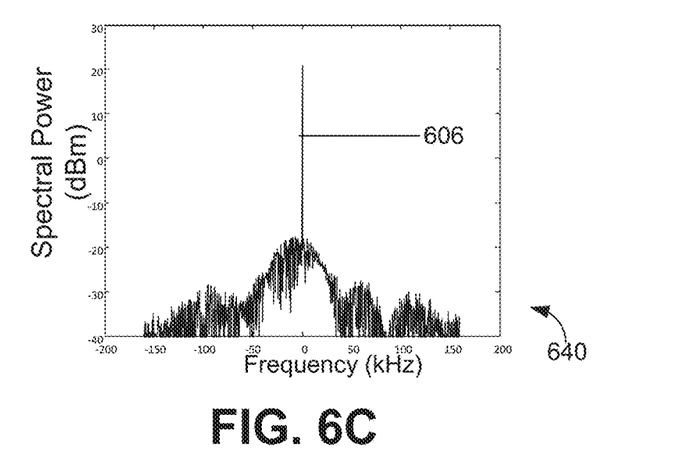
FIG. 6C illustrates the pilot tone can be extracted from the spread spectrum after the spurs are removed from the spread spectrum.

One insight provided by the inventors for addressing the aforementioned noise in the decoded pilot tone is to remove the spurs in the spread spectrum before decoding for the pilot tone. In this way, the noise level due to spurs in the decoded pilot tone can be reduced. FIGS. 6A-C conceptually illustrate this solution. FIG. 6A illustrates one example graph 600 showing a spread spectrum 602 for a pilot tone that includes spurs 604. FIG. 6B illustrates one example graph 620 showing the spurs 604 shown in FIG. 6A can be removed from the spread spectrum 602 before decoding for the pilot tone. FIG. 6C illustrates one example graph 640 showing the pilot tone 606 can be extracted from the spread spectrum 602 after the spurs 604 are removed from the spread spectrum 602.

Figure 7:
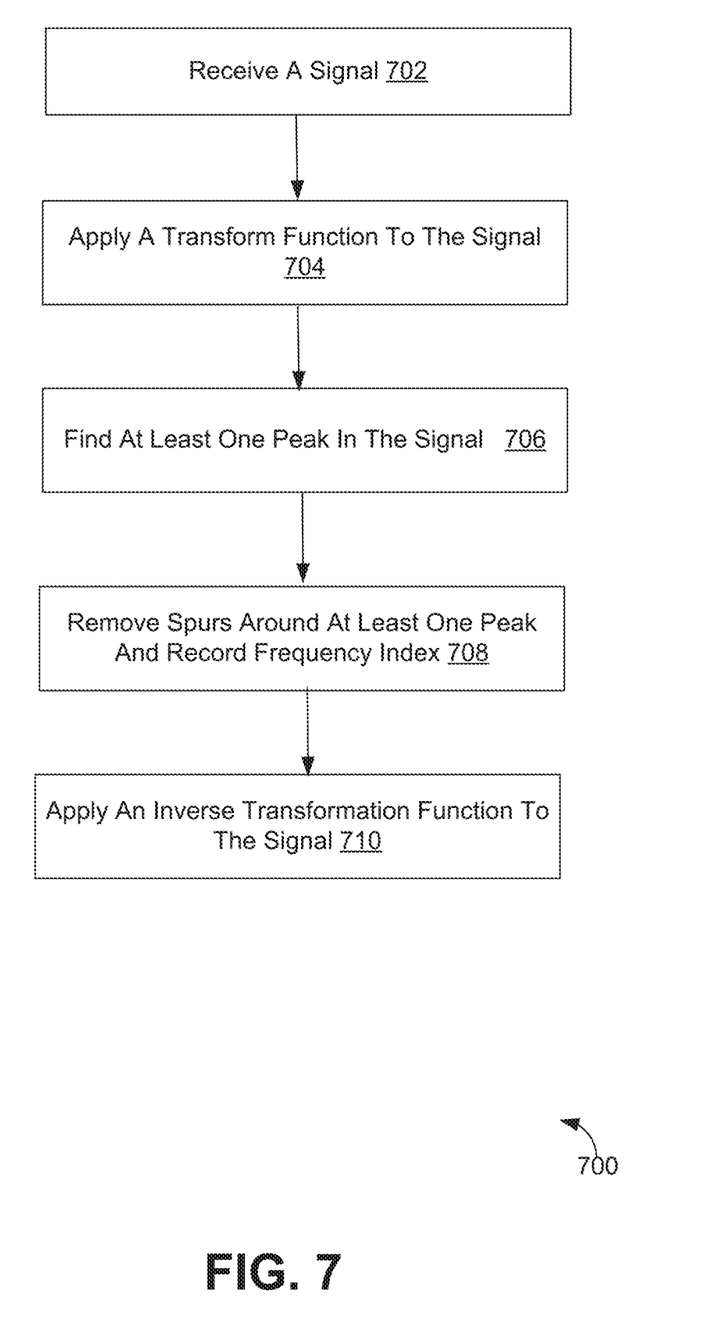
FIG. 7 illustrates one example method for removing spectral spurs in spread spectrum for a pilot tone in accordance with the disclosure.

FIG. 7 illustrates one example method 700 for removing spectral spurs in a spread spectrum for a pilot tone in accordance with the disclosure. The method presented in FIG. 7 and described below is intended to be illustrative and non-limiting. The particular series of processing steps depicted in FIG. 7 is not intended to be limiting. It is appreciated that the processing steps may be performed in an order different from that depicted in FIG. 7 and that not all the steps depicted in FIG. 7 need be performed.

Figure 10:
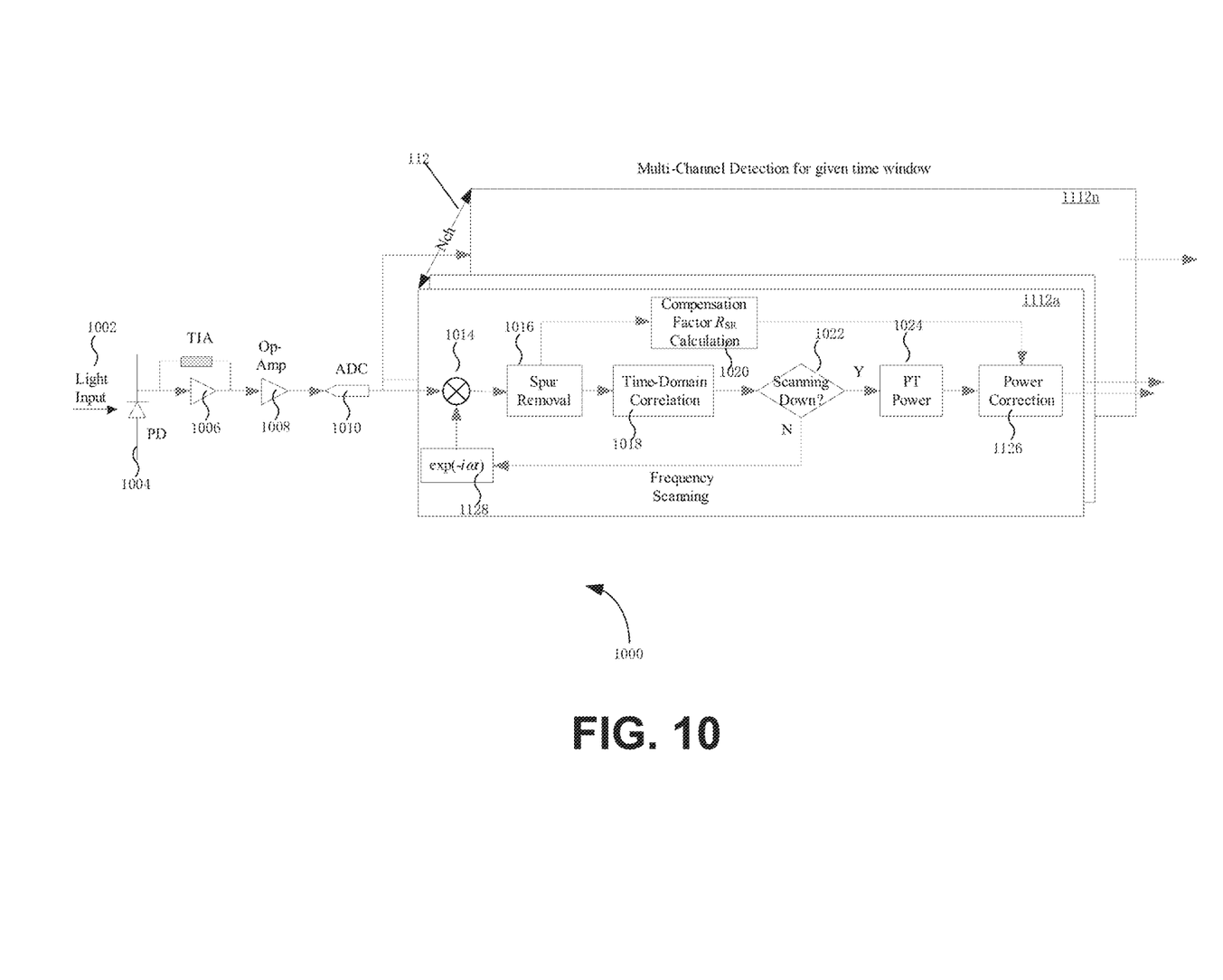
FIG. 10 illustrates an example implementation for removing spectral spurs in a pilot-tone spread signal in accordance with one embodiment of the disclosure.

In some embodiments, the method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700. In some embodiments, the method presented in FIG. 7 and described below can be performed by a pilot-tone detector. An example implementation of such a pilot-tone detector is illustrated in FIG. 10.

At 702, the pilot-tone detector receives a pilot-tone spread signal. At 704, the pilot-tone detector applies a transformation to the signal received at 702 to transform the signal from a time domain to a frequency domain. In some examples, a fast Fourier transform may be applied to the signal received at 702 to obtain a spread spectrum for the pilot-tone At 706, the pilot-tone detector performs a peak search to find at least one peak in the signal transformed at 704. As can be seen from FIG. 6A, the spread spectrum 602 in the frequency domain can be treated as a slowly changing background compared to spurs 604. In some implementations, a threshold is set to several dB above the slowly changing background. Thus, the spectral power for a given point in the spread spectrum 602 when detected as being above this threshold can be recorded as a peak. When a peak is detected, the frequency index corresponding to this peak can be recorded.

At 708, the pilot-tone detector removes a portion of the spectrum around each peak detected at 706 and records the frequency index at which the removal is performed. The recorded frequency index of the removed spectra is used later for power compensation, as will be described below in greater detail. In various embodiments, the amount of the spectrum, for example the frequency range or the number of points, removed at 708 can be predetermined according to the fiber link configuration. As one skilled in the art would understand, the amount of points removed at 708 is not limited and may be a design choice.

At 710, the pilot-tone detector applies an inverse transform function to the spread spectrum modified at 708. The inverse transform performed by the pilot-tone detector at 710 can transform the modified spread spectrum from the frequency domain into the time domain so that a reported power of the pilot-tone spread signal can be obtained. As should be clear, this reported power of the pilot-tone spread signal is the power of the pilot-tone spread signal after the spur removal is performed at 708. In some implementations, an inverse fast Fourier transform may be applied to the spread spectrum modified at 708 at 710.

In some situations, the example spurs removal method 700 illustrated in FIG. 7 may inadvertently remove part of the pilot-tone spread signal, which can lead to pilot-tone power error. For ensuring more accurate pilot-tone power after the spur removal, in some implementations, a power compensation factor calculation can be performed to compensate for the aforementioned power loss during the spur removal. A goal of this power compensation factor calculation is to compute a power ratio between the power of an ideal (or theoretical) spread spectrum and the power of the spread spectrum after the spur removal. One example of this ideal spread spectrum is shown FIG. 4 as spread spectrum 402. This ideal spread spectrum may be referred to as "a reference spread spectrum" for the pilot tone. This reference spread spectrum can be known in advance because the pilot tone is known (power and frequency) and the spread code for spreading the pilot tone is predetermined.

One example power compensation factor calculation for compensating the PT power loss during the spurs removal is described below:

$$R_{SR} = \frac{\int_{-\infty}^{\infty} |C(\omega)|^2 \, d\omega}{\int_{-\infty}^{\infty} |C_{SR}(\omega)|^2 \, d\omega}$$

Equation 1

In equation 1 above, $C(\omega)$ is the reference spread spectrum of the transmitted pilot-tone signal $C(t)$, $C_{SR}(\omega)$ is a spread spectrum of the pilot-tone after the spur removal (i.e., the output at 708 as described and illustrated in FIG. 7), and $R_{SR}$ is the power ratio between the reference spread spectrum and the spread spectrum for the PT spread signal after the spur removal. As mentioned above, $C(\omega)$ can be known in advance. Assuming $P_{SR}$ is the reported power for the PT spread signal after the spur removal, $P_{SR}$ can be modified using the following equation to obtain a power for the PT spread signal that accounts for the aforementioned power loss, which may be referred to as a modified power for the PT spread signal or $P_{modified}$:

$$P_{modified} = P_{SR} \times R_{SR}.$$

Equation 2

Figure 8:
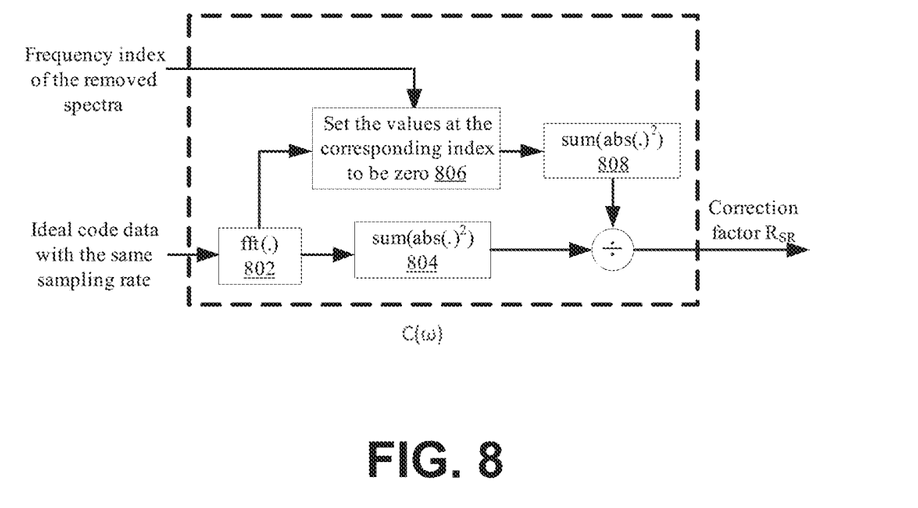
FIG. 8 is a block diagram illustrating one example implementation for the power compensation factor calculation for compensating the PT power loss during spur removal.

FIG. 8 is a block diagram illustrating one example implementation for the power compensation factor calculation for compensating the PT power loss during spur removal. As shown, in this example implementation, ideal spread code without spurs can be fed to a block 802 for fast Fourier transform. The output of block 802 can then be fed to block 804 for an approximation calculation of $\int_{-\infty}^{\infty} |C(\omega)|^2 d\omega$ shown above. As also shown, the output of block 802 and the frequency indexes where spurs are removed can be fed to block 806. The frequency indexes fed to block 806 can be obtained from a spur removal logic implemented in accordance with the method 700 illustrated in FIG. 7. As shown, block 806 can be configured to set the power of the transformed ideal code at the corresponding frequency indexes to zero. This mimics power loss during the spur removal. The output of block 806 can then be fed to block 808 for an approximation of $\int_{-\infty}^{\infty} |C_{SR}(\omega)|^2 d\omega$. At block 810, the output of block 804 can be divided by the output of 808 to obtain the power compensation factor $R_{SR}$.

Figure 9:
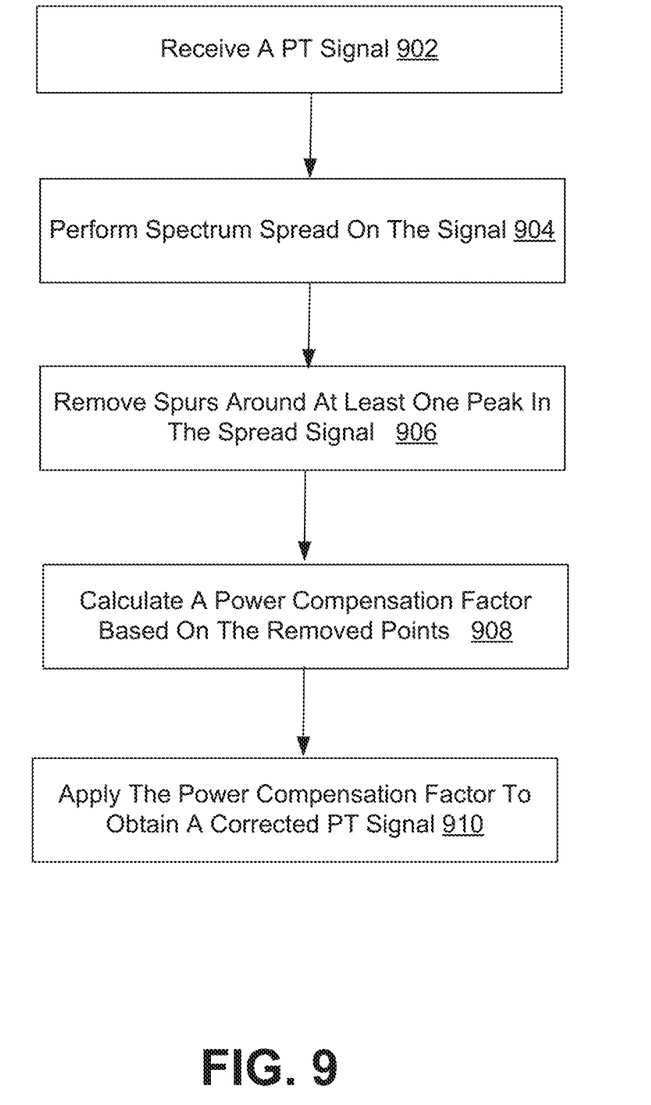
FIG. 9 illustrates one example method for obtaining a corrected pilot-tone signal by removing spurs in accordance with the disclosure.

FIG. 9 illustrates one example method 900 for obtaining a corrected pilot-tone signal by removing spurs in accordance with the disclosure. The method presented in FIG. 9 and described below is intended to be illustrative and non-limiting. The particular series of processing steps depicted in FIG. 9 is not intended to be limiting. It is appreciated that the processing steps may be performed in an order different from that depicted in FIG. 9 and that not all the steps depicted in FIG. 9 need be performed.

In some embodiments, the method depicted in method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900. In some embodiments, the method presented in FIG. 9 and described below can be performed by a pilot-tone detector. An example implementation of such a pilot-tone detector is illustrated in FIG. 10.

As shown, at 902, the pilot-tone detector receives a pilot-tone spread signal in a time domain. U.S. patent application Ser. No. 15/074,243, entitled "Optical Channel Monitoring Using Expanded-Spectrum Pilot Tone", which is incorporated by reference herein in its entirety, provides some example methods that can be used to perform spreading on a pilot tone; and characteristics of the pilot-tone spread signal received at 902 is thus not explained here in detail. At 904, the pilot-tone detector transforms the pilot-tone spread signal received at 902 from the time domain into the frequency domain to obtain a spread spectrum for the pilot-tone spread signal received at 902.

At 906, the pilot-tone detector removes a predetermined number of points around at least one peak in the spread spectrum obtained at 904. In some implementations, operations 706 and 708 in method 700 as illustrated in FIG. 7 can be applied at 906. At 908, the pilot-tone detector obtains a reported power of the pilot-tone spread signal after the spur removal. In some implementations, operations performed at 908 may involve transforming the spread spectrum modified at 906 back to the time domain.

At 910, the pilot-tone detector calculates a power compensation factor based on the spectral power removed at 906 and a reference spread spectrum for the pilot tone for compensating PT power removed at 906. An example of such a calculation is explained above in equation 1. At 912, the pilot-tone detector applies the power compensation factor calculated at 910 to the reported power obtained at 908 to obtain modified power for the pilot tone spread signal. An example of such a calculation is shown above in equation 2. At 912, the pilot-tone detector decodes the pilot-tone spread signal modified at 912 to obtain a pilot tone.

FIG. 10 illustrates an implementation of removing spectral spurs in a pilot-tone spread signal in accordance with one embodiment of the disclosure. In the embodiment illustrated by way of example in FIG. 10, a pilot-tone detector 1000 receives, detects and decodes the pilot tone to recover the PT bit sequence d(t). As shown, the optical receiver 1100 can include a light input (optical link) 1002, a photodiode (PD) 1004, a transimpedance amplifier (TIA) 1006, an operational amplifier ("op-amp") 1008, i.e. an AC-coupled high-gain electronic voltage amplifier, an analog-to-digital converter (ADC) 1010 for digitizing the analog electrical signal, a plurality of detectors, such as 1012a-n for the multiple channels. There is one detector (processing block) 1012 for each channel in this embodiment.

In the embodiment of FIG. 10, the individual detector 1012, such as 1012a, includes a mixer 1014 for applying a down-shifting factor 1028 to the signal from the ADC 1010 to shift the signal frequency down to around DC. In this example, the detector 1012a includes a spur removal unit 1016, which can be configured to perform one or more steps in method 700 illustrated in FIG. 7. In this example, the detector 1012a also includes a time-domain correlator (or "time-domain correlation module") 1018 and a decision block 1022 which determines if the frequency scanning has been completed. If the scanning has been completed, the signal can be fed to the PT power determination unit 1024 to obtain a reported power for the pilot-tone spread signal after the spur removal is performed by the spur removal component 1016. Otherwise, the frequency can be further scanned by incrementing or decrementing the angular frequency $\omega$ of the down-shifting factor 1028.

As mentioned above, during the spur removal, a portion of the PT power may be inadvertently removed, and a power compensation factor can be calculated, for example, by implementing equation 1. As shown, for achieving this, the pilot-tone detector 1000 can include a compensation factor $R_{SR}$ unit 1020. An example implementation of $R_{SR}$ unit 1020 is illustrated in FIG. 8. As also shown, the pilot-tone detector 1000 can include a power correction unit 1026 that can be configured to apply the power compensation factor calculated by the compensation factor $R_{SR}$ unit 1020 to the PT power determined by the PT power determination unit 1024. As shown, the pilot-tone detector 1000 can include a pilot-tone decoder 1130 configured to decode the pilot-tone spread signals output by the individual detectors 1112a-n to obtain the pilot tone.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An optical receiver for removing spectral spurs in a pilot-tone spread signal, the optical receiver comprising:
   a digital signal processor configured to detect a pilot-tone spread signal, the digital processor comprising:
   a spur removal component configured to remove spectral spurs in the pilot-tone spread signal in a frequency domain and to output a spur-removed spread spectrum for the pilot-tone spread signal, wherein removing the spectral spurs in the pilot-tone spread signal in the frequency domain includes:
   identifying at least one peak in the pilot-spread signal; and
   removing one or more points around the at least one peak.

2. The optical receiver of claim 1, further comprising:
   a pilot-tone power determination component configured to determine a reported power for the pilot-tone spread signal based on the spur-removed spread spectrum; and
   a pilot-tone decoder configured to decode the pilot-tone spread signal based on the reported power for the pilot-tone spread signal.

3. The optical receiver of claim 1, comprising:
   a pilot-tone power determination component configured to determine a reported power for the pilot-tone spread signal based on the spur-removed spread spectrum;
   a power compensation factor calculation component configured to compute a power compensation factor for compensating a power loss caused by removing the spectral spurs in the pilot-tone spread signal in the frequency domain performed by the spur removal component;
   a power correction component configured to apply the power compensation factor to the reported power for the pilot-tone spread signal to obtain a modified power for the pilot-tone spread signal; and
   a pilot-tone decoder configured to decode the pilot-tone spread signal based on the modified power for the pilot-tone spread signal.

4. The optical receiver of claim 3, wherein computing the power compensation factor comprises computing a power ratio between a power of a reference spread spectrum and a power of the spur-removed spread spectrum.

5. The optical receiver of claim 4, wherein the reference spread spectrum is a spread spectrum of the transmitted pilot tone.

6. The optical receiver of claim 4, wherein the power ratio computation by the power compensation factor calculation component employs the following equation:

$$R_{SR} = \frac{\int_{-\infty}^{\infty} |C(\omega)|^2 \, d\omega}{\int_{-\infty}^{\infty} |C_{SR}(\omega)|^2 \, d\omega},$$

wherein $C(w)$ is a spectrum of the pilot-tone spread signal $C(t)$ before the spur removal, $C_{SR}(w)$ is a spectrum of $C(t)$ after the spur removal, and $R_{SR}$ is the computed power ratio.

7. The optical receiver of claim 3, wherein applying the power ratio to the reported power for the pilot-tone spread signal to obtain the modified power for the pilot-tone spread signal employs the following equation:

$$P_{modified} = P_{SR} \times R_{SR},$$

wherein $P_{SR}$ is the reported power for the pilot-tone spread signal after the spur removal, and $P_{modified}$ is the modified power of the pilot-tone spread signal.

8. The optical receiver of claim 1, wherein identifying the at least one peak in the pilot-spread signal includes:
   determining a power of the pilot-spread signal at a particular frequency in the frequency domain is above a predetermined threshold.

9. The optical receiver of claim 8, wherein identifying at least one peak in the pilot-spread signal comprises recording an index of the particular frequency in the frequency domain.

10. A method for removing spectral spurs in a pilot-tone spread signal, the method being implemented by a digital signal processor of an optical receiver, the digital signal processor being configured to detect a pilot-tone spread signal, the method comprising:
    removing spectral spurs in the pilot-tone spread signal in a frequency domain; and
    outputting a spur-removed spread spectrum for the pilot-tone spread signal; and, wherein
    removing the spectral spurs in the pilot-tone spread signal in the frequency domain includes:
    identifying at least one peak in the pilot-spread signal; and
    removing one or more points around the at least one peak.

11. The method of claim 10, further comprising:
    determining a reported power for the pilot-tone spread signal based on the spur-removed spread spectrum; and
    decoding the pilot-tone spread signal based on the reported power for the pilot-tone spread signal.

12. The method of claim 11, further comprising:
    determining a reported power for the pilot-tone spread signal based on the spur-removed spread spectrum;
    computing a power compensation factor for compensating a power loss caused by removing the spectral spurs in the pilot-tone spread signal in the frequency domain;
    applying the power compensation factor to the reported power for the pilot-tone spread signal to obtain a modified power for the pilot-tone spread signal; and
    decoding the pilot-tone spread signal based on the modified power for the pilot-tone spread signal.

13. The method of claim 12, wherein computing the power compensation factor comprises computing a power ratio between a power of a reference spread spectrum and a power of the spur-removed spread spectrum.

14. The method of claim 13, wherein the reference spread spectrum is a spread spectrum of the transmitted pilot tone.

15. The method of claim 13, wherein computing the power ratio between the power of the reference spread spectrum and the power of the spur-removed spread spectrum employs the following equation:

$$R_{SR} = \frac{\int_{-\infty}^{\infty} |C(\omega)|^2 \, d\omega}{\int_{-\infty}^{\infty} |C_{SR}(\omega)|^2 \, d\omega},$$

wherein $C(w)$ is a spectrum of the pilot-tone spread signal $C(t)$ before the spur removal, $C_{SR}(w)$ is a spectrum of $C(t)$ after the spur removal, and $R_{SR}$ is the computed power ratio.

16. The method of claim 12, wherein applying the power ratio to the reported power for the pilot-tone spread signal to obtain the modified power for the pilot-tone spread signal employs the following equation:

$$P_{modified} = P_{SR} \times R_{SR},$$

wherein $P_{SR}$ is the reported power for the pilot-tone spread signal after the spur removal, and $P_{modified}$ is the modified power of the pilot-tone spread signal.

17. The method of claim 10, wherein identifying the at least one peak in the pilot-spread signal includes:
    determining a power of the pilot-spread signal at a particular frequency in the frequency domain is above a predetermined threshold.

18. The optical receiver of claim 17, wherein identifying at least one peak in the pilot-spread signal comprises recording an index of the particular frequency in the frequency domain.

\* \* \* \* \*

UNITED STATES PATENT AND TRADEMARK OFFICE
CERTIFICATE OF CORRECTION

PATENT NO.         : 10,348,438 B2
APPLICATION NO.    : 15/694983
DATED              : July 9, 2019
INVENTOR(S)        : Minggang Si et al.

It is certified that error appears in the above-identified patent and that said Letters Patent is hereby corrected as shown below:

In the Claims

In Claim 18, Column 11, Line 13, "The optical receiver of claim 17" should read --The method of claim 17--.

Signed and Sealed this
Ninth Day of March, 2021

Drew Hirshfeld
*Performing the Functions and Duties of the
Under Secretary of Commerce for Intellectual Property and
Director of the United States Patent and Trademark Office*